Feb. 16, 1960           G. COHN           2,925,257
FUEL INDUCTION SYSTEM FOR INTERNAL COMBUSTION ENGINES
Filed Aug. 6, 1958           6 Sheets-Sheet 1
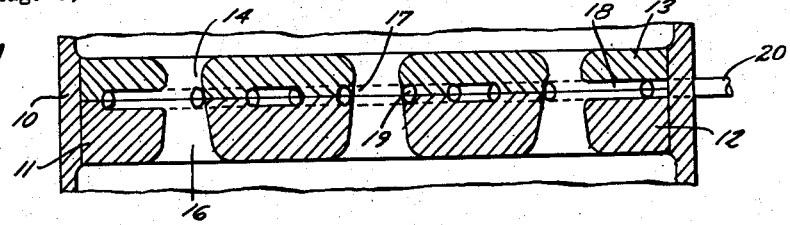
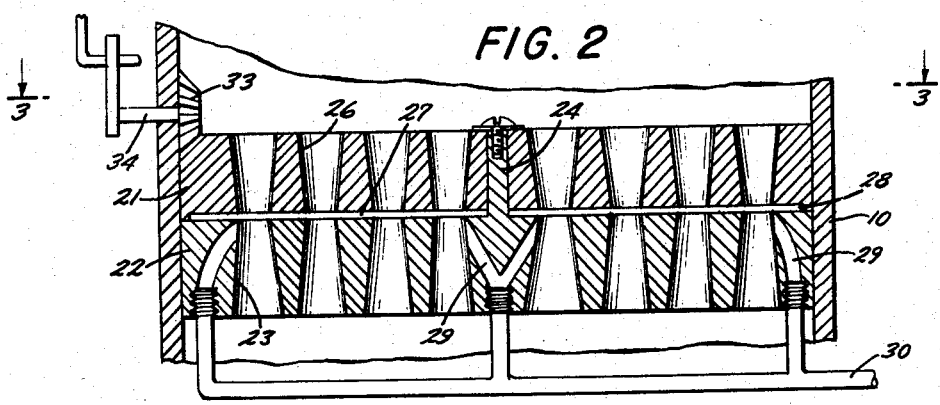
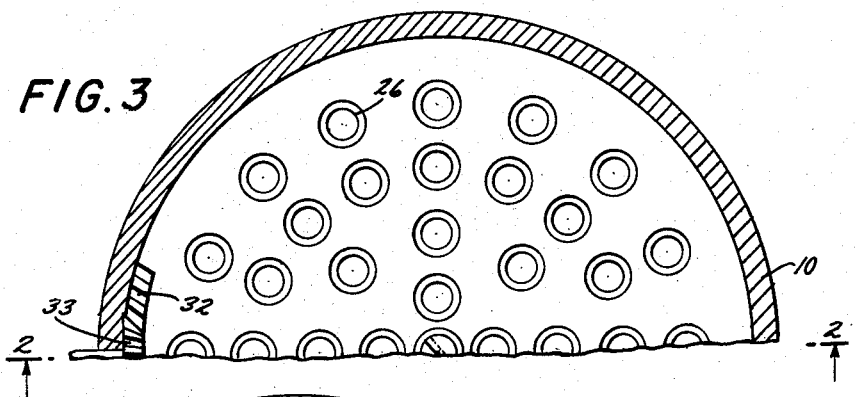
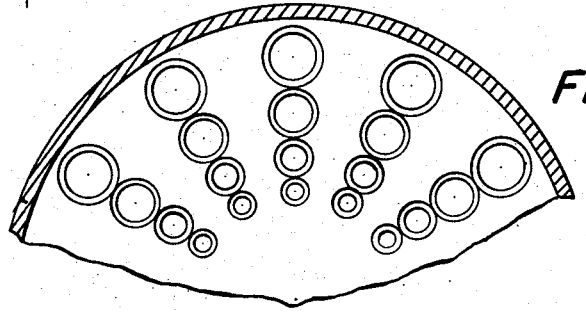
INVENTOR.
GEORGE COHN
BY
Amster + Levy
ATTORNEYS

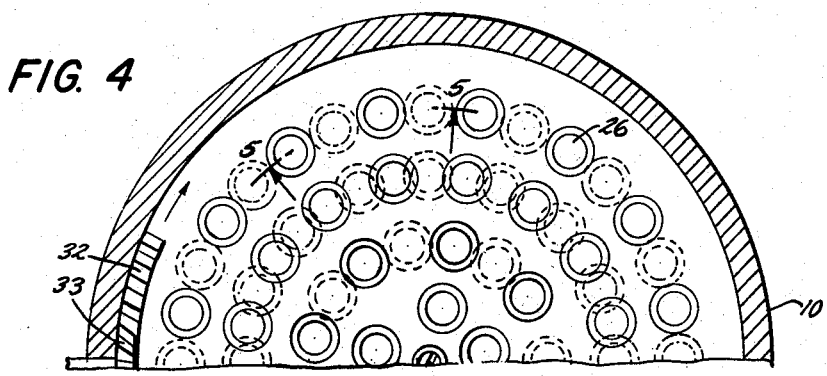
FIG. 4
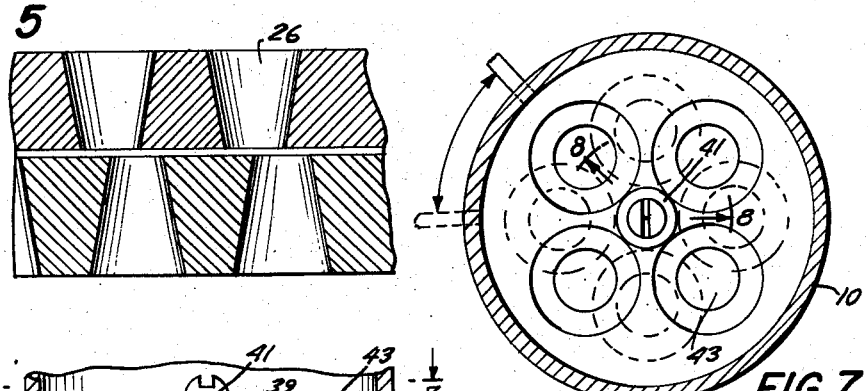
FIG. 5
FIG. 7
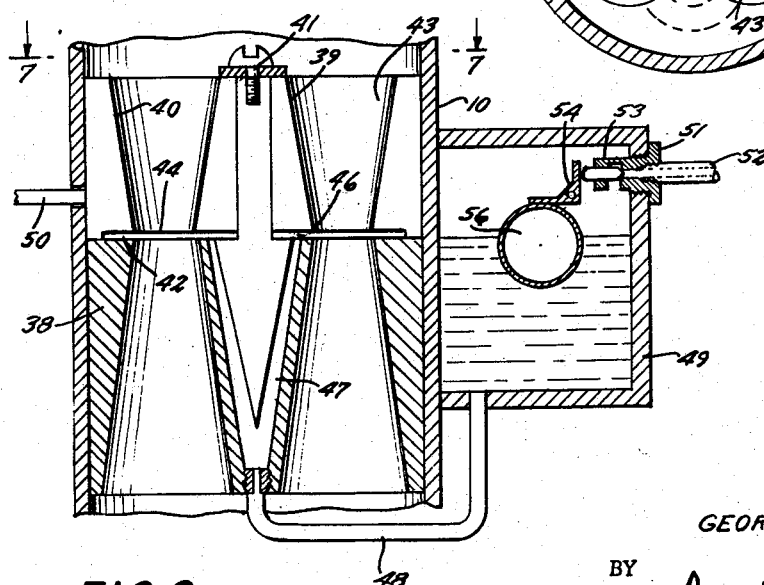
FIG. 6
INVENTOR.
GEORGE COHN
BY
Amster + Levy
ATTORNEYS Feb. 16, 1960 G. COHN 2,925,257
FUEL INDUCTION SYSTEM FOR INTERNAL COMBUSTION ENGINES
Filed Aug. 6, 1958 6 Sheets-Sheet 3

INVENTOR.
GEORGE COHN
BY Amster & Levy
ATTORNEYS

Feb. 16, 1960 G. COHN 2,925,257
FUEL INDUCTION SYSTEM FOR INTERNAL COMBUSTION ENGINES
Filed Aug. 6, 1958 6 Sheets-Sheet 4
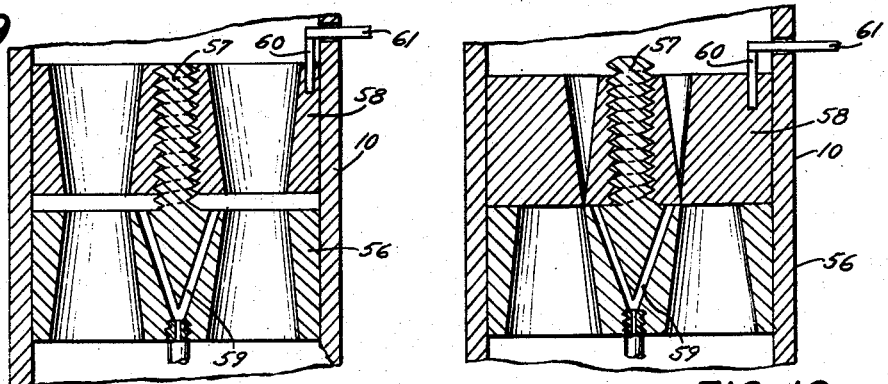
FIG. 9
FIG. 10
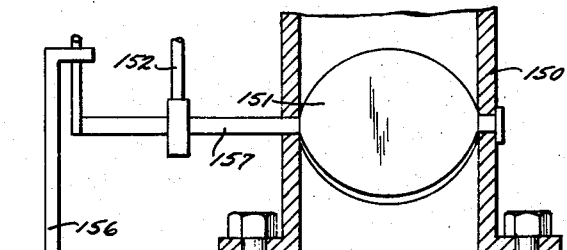
FIG. 15
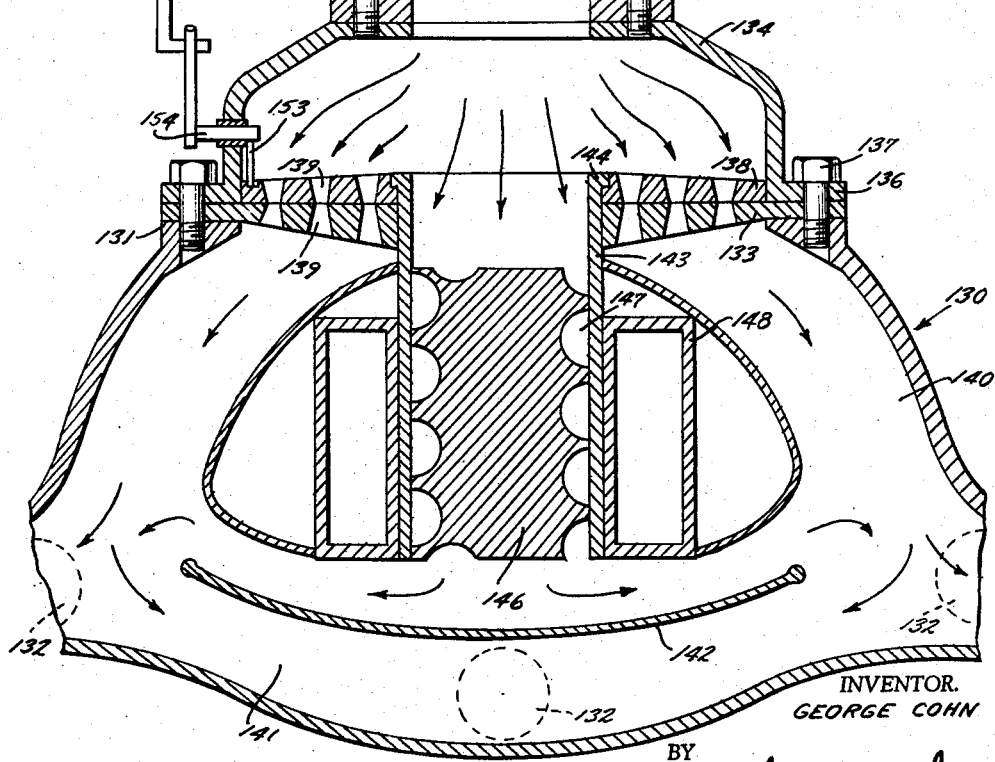
INVENTOR.
GEORGE COHN
BY
ATTORNEYS

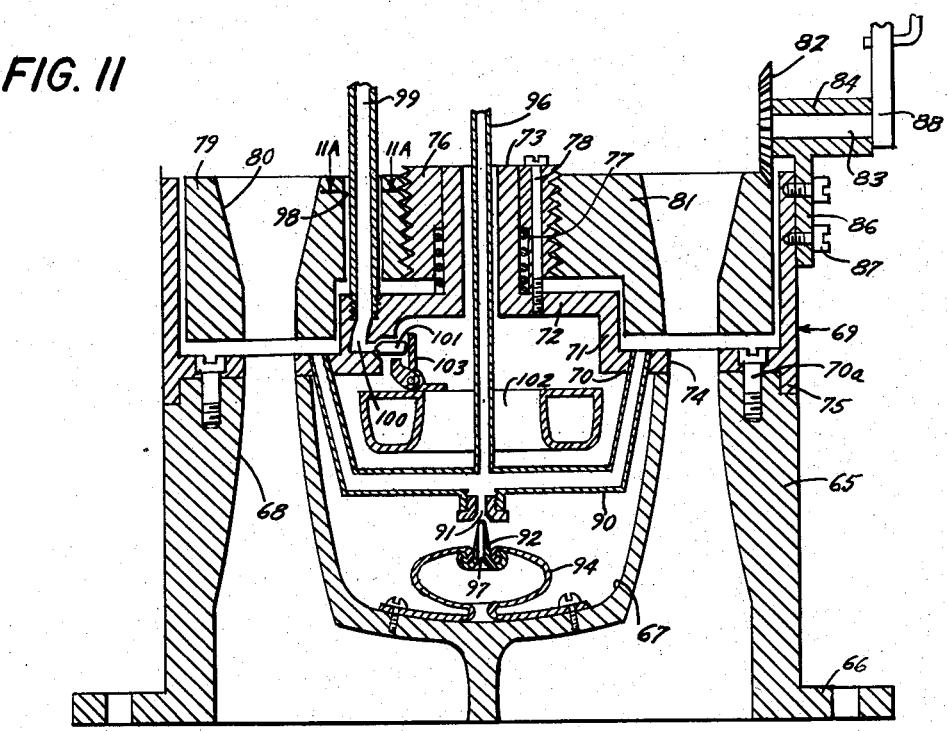

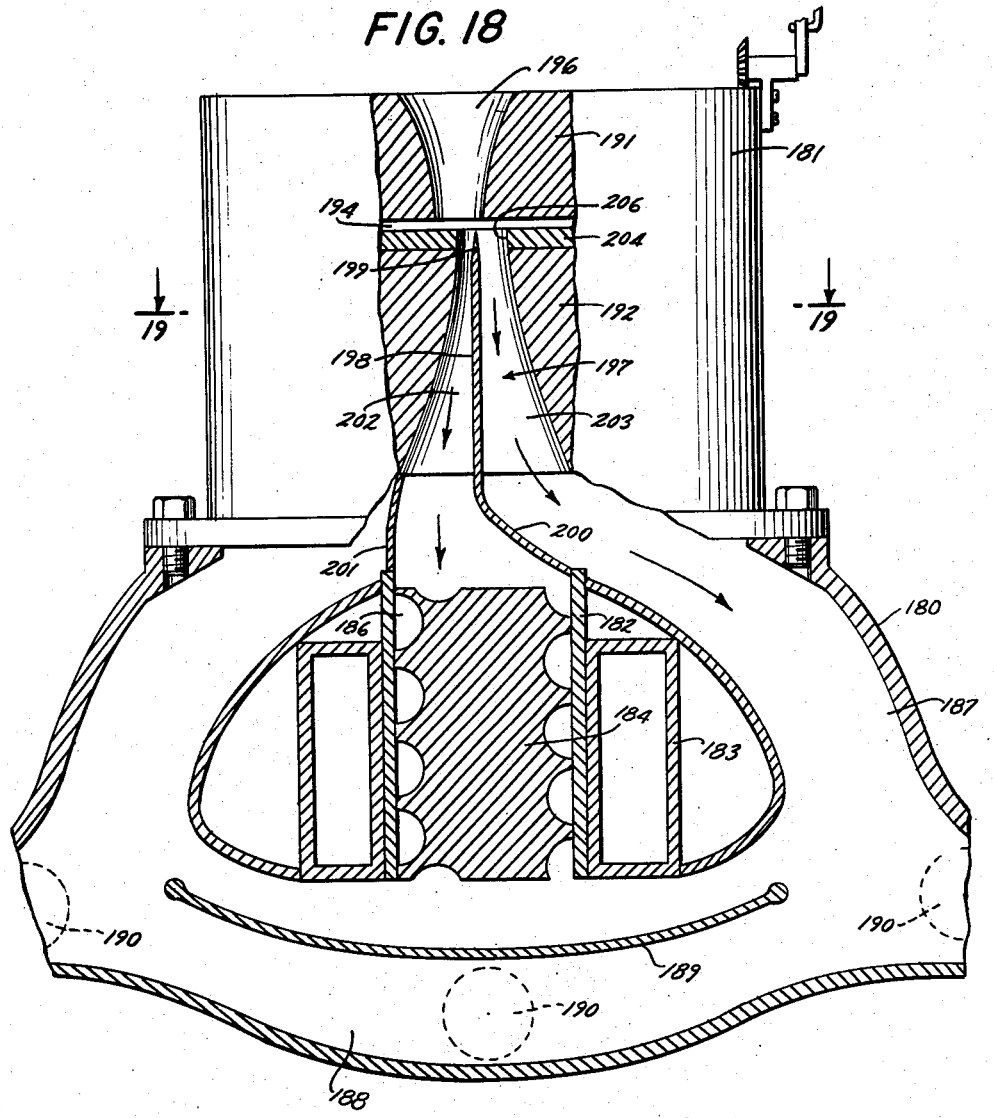
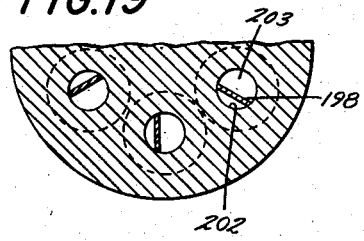
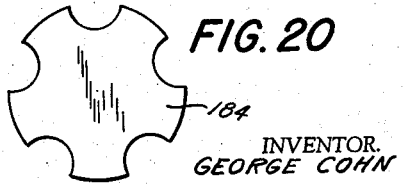

United States Patent Office

2,925,257
Patented Feb. 16, 1960

2,925,257

FUEL INDUCTION SYSTEM FOR INTERNAL COMBUSTION ENGINES

George Cohn, New York, N.Y.

Application August 6, 1958, Serial No. 753,486

20 Claims. (Cl. 261—145)

The present invention relates generally to improvements in internal combustion engines, and it relates more particularly to an improved device for the preparation and control of combustible mixtures for internal combustion engines.

In internal combustion engines, particularly of the multicylinder carburetion type which are normally operated under widely varying conditions of loading, speed, acceleration, position and temperature, an important source of inefficiency resides in the preparation of the combustible fuel and air mixture and its delivery to the individual cylinders. The carburetion and distribution system usually comprises a carburetor communicating with the air by way of an air filter and with the individual cylinders by way of a distributing manifold. The carburetor includes a venturi having a nozzle located at the throat of the venturi and connected to a source of liquid fuel by way of a float chamber which maintains a constant fuel level in the nozzle. Butterfly valves upstream and downstream of the carburetor permit continuous control respectively of the richness of the fuel air mixture and the volume thereof.

The conventional carburetor and fuel mixture distribution system, as aforesaid, possesses numerous drawbacks and disadvantages and leaves much to be desired. They are usually designed for optimum performance under a given set of conditions and any deviation from these conditions is accompanied by a sharp drop in the quality and efficiency of performance. Such deviations continuously occur in the loading, speed, acceleration and temperature of the engine. The immediate results are the entrainment of large unvaporized droplets of fuel in the combustible mixture, heterogeneous air and fuel mixture, a non-uniform delivery of the combustible mixture to the various cylinders, and a fuel mixture whose composition is poor. The consequences are a drop in engine efficiency, a reduction in torque and overall power and acceleration, rough engine performance, thinning of lubricating oil to increase engine wear and oil consumption, high carbon deposits in the cylinders, gumming and burning of the spark plugs and intake and exhaust valves, and other undesirable results. There have been proposed and employed many devices for compensating for varying engine operating conditions but these for the most part have had only a limited effect in alleviating the above difficulties.

A solution of the present problem has been set forth in the copending patent application of George Cohn entitled, Fuel Distribution Systems, Serial No. 524,117, filed July 25, 1955 now Patent No. 2,857,898 granted October 28, 1958. The present invention provides alternative and improved devices for effecting the preparation and distribution of fuel mixtures in internal combustion engines.

It is thus a principal object of the present invention to provide an improved internal combustion engine.

Another object of the present invention is to provide an improved device for the preparation of combustible fuel mixtures.

Still another object of the present invention is to provide an improved air fuel mixture preparation device for internal combustion engines characterized by the homogeneity of the mixture and the complete vaporization of the fuel under substantially all engine operating conditions.

A further object of the present invention is to provide an improved device of the above nature in which the composition of the air fuel mixture is maintained at its optimum under varying conditions of engine operation.

Still a further object of the present invention is to provide a simple, rugged and inexpensive air fuel mixture preparation device for internal combustion engines which results in improved engine performance and efficiency under varying conditions and greatly reduces carbon deposits and engine wear.

An important concept embodied in the present invention resides in the formation of a multiplicity of low pressure zones across the flow of air to an engine combustion chamber and the introduction of the fuel into each of these zones whereby a complete atomization or vaporization of the fuel is achieved under various engine operating conditions to provide a homogeneous fuel mixture characterized by the absence of large fuel particles. The above concept is realized by the disposition in and across the duct leading from the air supply to the engine combustion chamber of a diffusion member which has a multiplicity of venturi-shaped apertures formed therein aligned with the gas flow direction, and openings are formed in the walls of the venturis communicating with a fuel supply.

A further concept resides in the adjustment of the gas flow characteristics through the venturi apertures. This is accomplished in accordance with the present invention by forming the diffusion member of a pair of superimposed plates mutually slidable relative to each other to permit adjustment of or complete and selective closing of the venturi apertures. This permits a complete control of the rate of fuel mixture feed without adversely effecting the composition thereof. Employing the device of the present invention a controlled variable homogeneous fuel mixture is continuously produced so that an optimum combustible mixture is uniformly and continuously delivered to each of the engine cylinders or combustion chambers. As a consequence, there is achieved an engine which performs smoothly and efficiently and provides a maximum of available power under varying conditions of load, acceleration, speed and temperature, and which is subject to a minimum of wear, carbon and gum deposits, and other deteriorating factors.

The above brief description as well as further objects, features, and numerous modifications of the invention will be best appreciated by reference to the following detailed description of several illustrative forms of the invention when taken in conjunction with the accompanying drawings, wherein Fig. 1 is a longitudinal view of a basic form of diffusion member embodying the present invention, illustrated located in the input duct of an internal combustion engine;

Fig. 2 is a longitudinal sectional view of another embodiment of the present invention;

Fig. 3 is a sectional view taken along line 3—3 of Fig. 2;

Fig. 3a is a view similar to Fig. 3, illustrating another form of the diffusion member;

Fig. 4 is a view similar to Fig. 3, illustrating the diffusion member plates relatively rotated toward a closed position;

Fig. 5 is a sectional view taken along line 5—5 in Fig. 4;

Fig. 6 is a longitudinal sectional detailed view of still another embodiment of the present invention, illustrated with an associated float chamber;

Fig. 7 is a sectional view taken along line 7—7 in Fig. 6, illustrating, by broken line, the diffusion plate in closed position;

Fig. 9 is a longitudinal sectional view of a further embodiment of the present invention, illustrating the diffusion member in fully open position;

Fig. 10 is a view similar to Fig. 9, illustrating the diffusion member in closed position;

Fig. 11 is a longitudinal sectional view of still a further embodiment of the present invention having incorporated therein a coaxially located float chamber and a thermostatically controlled fuel inlet;

Fig. 11a is a sectional view taken along line 11a—11a in Fig. 11;

Fig. 15 is a longitudinal sectional view of still another embodiment of the present invention;

Fig. 16 is a top plan view partially in section of another form of the improved diffusion member;

Fig. 16a is a sectional view taken along line 17—17 in Fig. 16;

Fig. 17 is a sectional view taken along line 18—18 in Fig. 16;

Fig. 18 is a front elevational view of a further embodiment of the present invention;

Fig. 19 is a cross-sectional view taken along line 19—19 in Fig. 18; and

Fig. 20 is a top plan view of the heat exchange plug unit of the last illustrated embodiment.

Figure 8:
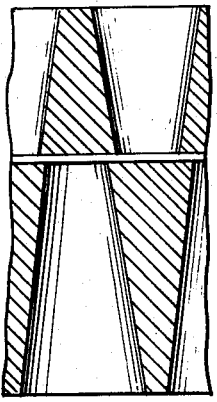
Fig. 8 is a sectional view taken along line 8—8 in Fig. 7, shown partially broken away for convenience of illustration.

Referring now to the drawings and more particularly to Fig. 1 thereof which illustrates the present improved device in its basic form, the numeral 10 generally designates a duct extending between a source of air or a source of an air fuel mixture and a combustion chamber of an internal combustion engine, for example, the conventional multicylinder reciprocating engine. The upstream end of the duct 10 is provided with a conventional air filter and may also include a carburetor, butterfly choke valve, and various other accessory and auxiliary equipment associated with the fuel and carburetion system of an internal combustion engine. The downstream portion of the duct 10 may lead directly to the inlet port of an engine cylinder or may communicate with a plurality of cylinders by way of a distributing manifold.

Located and suitably supported within the duct 10 and extending for the full area thereof is a diffusion member 11 including a lower plate 12 and an upper plate 13 superimposed upon the plate 12. Upper and lower registering vertically aligned apertures 14 and 16 respectively are formed in the upper and lower plates 13 and 12, each pair of associated apertures 14 and 16 being of such configuration as to form a venturi having a constricted throat portion 17, the wall of the venturi being of streamlined contour so that the flow of gas through the venturis is laminar with a minimum of eddies and turbulence. A plurality of complementary grooves of semicircular cross section are formed in the conforming faces of the plates 12 and 13 to define conduits or passageways 18 which communicate with the venturi throat portions 17, preferably at the point of minimum pressure, by way of openings 19 formed in the walls of the venturi throat 17. An inlet tube 20 passes through the wall of the duct 10 into communication with the passageway 18 and may be connected to a source of fuel. It should be noted that the fuel source may be in the form of a constant level float chamber normally associated with internal combustion engine carburetors or may be by way of an adjustable rate metering pump.

The passageway 18 may be formed into a plurality of independent non-communicating groups, each of the groups being employed for a separate function. For example, some of the passageways 18 may be connected to a source of fuel, others to a controlled source of air, and still others to vacuum controlled actuating devices such as ignition timing control devices, throttling devices, etc. It should be pointed out that while only three venturis have been illustrated across a section of the member 11 a much larger number is generally desirable in the diffusion member. The aggregate sectional area of the venturis should preferably be approximately equal to the cross sectional area of the air pipe and combustible mixture pipe leading to and away from the duct 10. Throttle valves of conventional construction may be located above and below the diffusion member 11 to control both the overall pressure and volume of gas passing through the diffusion member.

In Figures 2 through 5 of the drawing there is illustrated another form of the present invention which embodies the important feature providing for the adjustment of the venturi openings. This is broadly accomplished by the relative movement of the diffusion plates so as to vary the degree of registry of the apertures defining the individual venturis. More specifically, there is located in the duct 10 upper and lower plates 21 and 22 respectively which are arranged in superimposed condition and are each of circular configuration. The lower plate 22 is fixed in the duct 10 and is provided with apertures 23 having a plurality of upwardly inwardly inclined flared conical walls. A stub shaft 24 projects upwardly from the center of the lower plate 22 and rotatably engages a corresponding axial opening formed in the upper plate 21 to permit the rotation of the upper plate 21 relative to the lower plate 22. The upper plate 21 is secured to the plate 22 by means of a screw engaging a tapped opening in the shaft 24.

A plurality of apertures 26 having downwardly inwardly inclined conical walls normally register with corresponding apertures 23 to define therewith venturis having constricted throat portions along the confronting faces of the upper and lower plates. Formed in the lower face of the upper plate 21 is a shallow circular recess 27 which extends to a point short of the periphery of the plate 21 to provide a depending annular lip 28 which rides along the upper surface of the plate 22. The recess 27 together with the confronting face of the lower plate 22 define passageways or conduits which communicate with the venturis at the constricted throat portions thereof. A plurality of bores 29 are formed in the lower plate 22 and communicate with the various venturis by way of the passage-defining recess 27 and are connected to a source of fuel, air or other device by way of one or more conduits 30 coupled to the bores 29.

In order to permit the control and adjustment of the venturis there is formed in the upper peripheral surface of the movable plate 21 a series of inclined teeth defining a rack 32. A beveled pinion gear 33 engages the rack 32 and is affixed to a shaft 34 passing through and rotatably carried by the wall of the duct 10, the shaft 34 being connected by any suitable linkage mechanism either to a hand or foot manipulated control or to a throttle valve or any automatic control. The upper plate 21 is preferably movable with respect to the lower plate 22 between a position in which the apertures 23 and 26 are in full registry to provide fully opened venturis and a position where the venturi-throats are completely closed.

The employment of the embodiment last described offers many advantages which are unavailable in the conventional carburetion systems. It permits a complete control of the combustible mixture composition since the pressure in the venturis may be controlled independently of the volume of air passing through the duct. This permits the achievement of a constant high velocity through the venturis at any degree of the throttle opening. The various modifications and accessories described in connection with the embodiment illustrated in Figure 1 of the drawing is similarly applicable to the present embodiment.

The arrangement of the venturi-defining apertures in the plates 21 and 22 may be varied as well as their relative sizes and configurations. For example, in Figure 3 of the drawing the venturis are illustrated as being each of the same overall dimensions and arranged along circles concentric with the center of the plates. In Figure 3a of the drawing the venturis are illustrated as being of decreasing diameter approaching the center of the plate and having their loci along the radii of the circular plates and along concentric circles. Other forms and arrangements of the venturi-defining apertures may be likewise employed.

Referring now to Figures 6 through 8 of the drawings there is illustrated an embodiment of the present invention in which the improved diffusion members form a primary source of carburetion. Located in the duct 10 is the lower relatively stationary plate 38 provided with an upwardly directed axial stub staft 39 which engages an axial opening formed in the upper plate 40 superimposed upon the plate 38, the plte 40 being rotatable relative to the plate 38. A suitable screw and washer arrangement 41 engages a tapped opening in the shaft 39 to maintain the plates 38 and 40 in assembled condition. The plates 38 and 40 have aligned tapered apertures formed therein which define venturis 43 having restricted throat portions 44. A circular recess 46 is disposed in the underface of the plate 40 and forms with the confronting face of the bottom plate 38 a passageway communicating with the venturi throats 44. Bores 47 are formed in the underplate 38 and communicate with the recess 46 and a conduit 48, which in turn is connected to a float chamber 49 through the bottom wall thereof.

In order to permit the adjustment and variation of the venturi openings there is provided a circumferential slot in the wall of the duct 10 through which projects a lever arm 50 affixed to the upper plate 40. In the illustrated embodiment the slot extends for approximately 45° so as to permit a corresponding rotation of the upper plate 40 permitting the variation of the venturi throats between a completely open and a completely closed position. The lever 50 can be connected to any form of manipulated or automatically regulated control mechanism.

The float chamber 49 and the associated mechanism are of conventional construction and include a threaded valve bushing 51 which engages a corresponding tapped opening in the upper side wall of the chamber 49 and has a valve seat located within the chamber. The bushing 51 is connected by way of a line 52 to the conventional fuel pump. A bracket supports a needle valve 53 in separable registry with the valve seat and is actuated by an arm of a pivotally mounted bell crank 54 which carries a float member 56. Thus, as the fuel level in the chamber 49 drops the needle valve is unseated permitting the entry of fuel into the chamber 49 which raises the float 56 and closes the valve by way of the bell crank 54. The level within the chamber 49 is preferably adjusted as illustrated to slightly below or substantially that of the top face of the lower plate 38 so that fuel will be drawn by the venturi only upon the passage of the air therethrough and the creation of reduced pressure. As in the previous embodiment, other accessories such as chokes, idler jets and accelerating pumps, etc. may be provided.

The operation of the carburetor is in the nature above described and it provides the important advantage over the conventional carburetor in that the continuously controllable area of the venturis permit the imparting of a constant high velocity to the fuel mixture. As a consequence, particularly at the lower engine speeds, greater torque is available.

In Figures 9 and 10 of the drawings there is illustrated another embodiment of the present invention characterized by the additional important feature of possessing adjustable fuel openings into the venturi throats. While in the illustrated device the venturi throat openings as well as the fuel openings into the venturi throats are dependently variable, these may be independently variable in any convenient manner. In the device illustrated in the diffusion member includes the lower stationary plate 56 which is provided with an upwardly directed axial threaded shank 57 which engages a tapped axial bore formed in the upper plate 58. Registering venturi-defining apertures are formed in the plates 56 and 58, the apertures being in aligned registry when the confronting faces of the plates 56 and 58 are separated as illustrated in Figure 9 of the drawing, and the venturi throats being completely closed when the confronting faces of the plates 56 and 58 are in abutment, as seen in Figure 10.

Formed in the central portion of the lower plate 56 are a plurality of upwardly diverging bores 59 which extend to the upper face of the plate 56 and communicate with the fuel passage space between the confronting faces of the upper and lower plates 56 and 58. The bores 59 are connected by way of a conduit to the source of fuel. In order to permit the variation of the venturi throat as well as the fuel openings into the throat there is provided an angular member including a vertical rod 60 engaging the upper plate 58 and a horizontal rod 61 extending from the upper end of the rod 60 through an annular opening formed in the duct 10. The rod 61 may be connected to any form of control mechanism.

In the embodiment last described the fuel opening into the venturi is increased with an increase in the venturi throat opening, thus permitting the production of an air fuel mixture of optimum composition at various rates of consumption. The interdependency between the fuel opening and the venturi throat is the function of the pitch of the thread of the shank 57 and may be constructed as desired. As set forth above, the fuel opening and the venturi throat adjustment may be independently controlled by means of cams of various sorts in any well known manner.

In Figures 11 and 11a there is illustrated a carburetor system, embodying the present invention, which is provided with the interdependently adjustable venturis and fuel openings, an axially located float bowl to minimize fuel feed variations with engine position and motion, and an automatic control jet arrangement. The carburetor includes a vertical base portion 65 having a lower flange 66 which permits the mounting of the carburetor on an inlet port of a distributing manifold. The base portion 65 is provided with a centrally axially located bowl 67. A plurality of circumferentially spaced vertically extending apertures 68 are formed between the bowl 67 and the outer wall of the base 65, the apertures 68 being upwardly inwardly inclined to a constricted throat portion.

Mounted on the upper part of the base 65 is a cap 69 which is provided with an inwardly projecting annular wall 70 resting on the top of the base 65 and secured thereto by bolts 70a. Depending from the outer edge of the annular wall 70 is a lip 75 which registers with the corresponding grooves formed in the outer upper face of the wall 65. Projecting upwardly from the inner edge of the wall 70 is a vertical cylindrical wall 71 having an inwardly directed annular flange 72 at its upper end which terminates in an upwardly directed tubular member 73. Formed in the annular wall 70 are a plurality of circular openings 74 which register with the upper ends of the base apertures 68.

Slidably engaging the tubular member 73 is an externally threaded bushing 76 which is urged upwardly by a helical spring 77 encircling the lower portion of the tubular member 73 and nesting in a groove formed in the inner face of the bushing 76 and entrapped between the upper shoulder of the aforesaid groove and the annular wall 72. A screw 78 passes through a vertical opening in the bushing 76 and engages a tapped bore in the wall 72 thereby permitting a vertical adjustment of a bushing 76.

Registering with the cap member 69 is an adjustable annular plate 79 having a plurality of circumferentially spaced inwardly downwardly flared openings 80 formed therein which are adapted to be brought into vertical registering alignment with the apertures 68 to define therewith venturis. The plate 79 has an upper inner portion 81 of decreased height to provide a downwardly directed recess which accommodates the cap portions 71 and 72 and is provided with a centrally tapped bore which engages the externally threaded bushing 76.

A portion of the upper outer annular edge of the plate 79 is provided with rack-defining teeth which engage a pinion bevel gear 82 affixed to the inner end of a shaft 83. The shaft 83 in turn is journaled in a bushing 84 secured by means of a bracket 86 and screws 87 to the outer wall of the cap 69. A lever 88 is affixed to the outer end of the shaft 83 and is connected by any suitable linkage mechanism to a control device. Thus, upon movement of the lever 88 the venturi throat openings may be controlled and interdependently therewith the fuel opening into the venturi throats which are defined by the passageways between the confronting faces of the plate 79 and the wall 74.

Located within the bowl 67 above the base thereof is a liquid fuel distributing manifold 90 which is connected by way of corresponding openings formed in the cap wall 70 with the passageways through the walls of the venturis. The manifold 90 includes an axially located downwardly directed opening which carries an orifice member 91 provided with a valve seat in its underface. Aligned with the orifice member 91 is a valve 92 carried by a thermostatically responsive support member 94 which is secured to the wall of the bowl 67. As the temperature of the support member 94 varies, the opening in the orifice 91 is correspondingly varied to thereby control the amount of liquid fuel delivered to the manifold 90. To facilitate this control the manifold 90 is connected by way of a vertical pipe 96 to the air so as to offer a greater range of control. Formed in the valve 92 is an axial bore 97 which prevents the complete closing of the orifice 91.

An arcuately extending opening 98 is formed in the plate inner portion 81 and has passing therethrough and spaced from the walls thereof a fuel inlet pipe 99. The lower end of the pipe 99 is coupled to the cap wall 72 and communicates with a bore 100 terminating in a valve seat having an associated needle valve 101. A toroidal shaped float 102 is located within the bowl 67 coaxial with the carburetor and the conduit 96, the float 102 beind hinged to a bracket carried by the cap wall 72. Needle valve 101 is controlled by an arm 103 extending upwardly from the float 102 to thereby maintain a constant predetermined fuel level within the bowl 67.

The carburetor last described possesses the various characteristics and advantages of the earlier described embodiments of the present invention. It provides complete uniform adjustment allowing for an optimum air fuel mixture independent of engine motion and position. The float being centrally located, and the fuel manifold opening being likewise centrally located, the fuel head along the openings into the venturi throats is constant. The various accessories and auxiliary equipment associated with carburetors may be employed.

Figure 14:
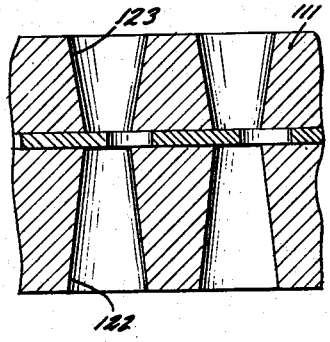
Fig. 14 is a sectional view taken along line 14—14 in Fig. 13, the control plate being illustrated in partially closed position.
Figure 12:
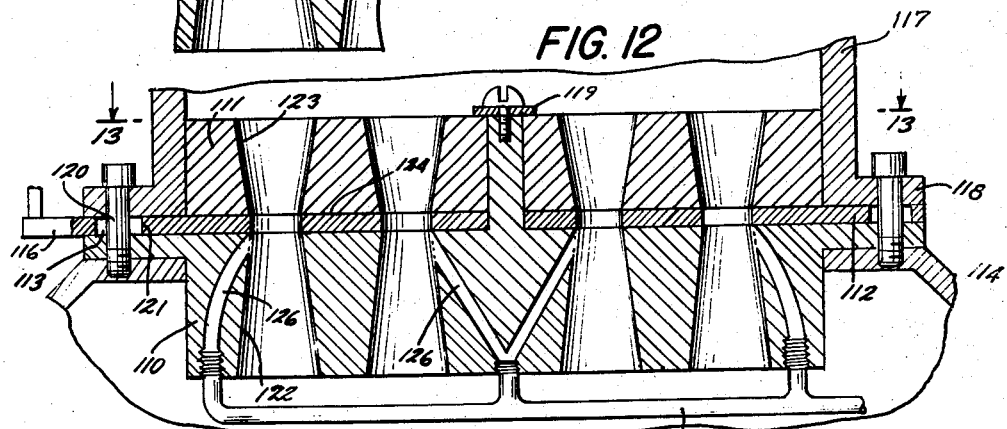
Fig. 12 is a longitudinal sectional view of another embodiment of the present invention.
Figure 13:
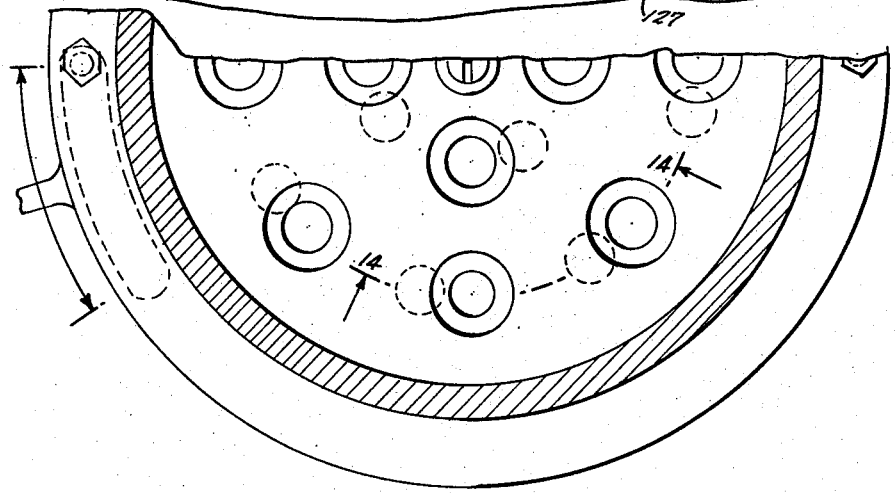
Fig. 13 is a sectional view taken along line 13—13 in Fig. 12, the diffusion member control element being illustrated by broken line in closed position.

In Figures 12, 13 and 14 there is illustrated an improved diffusion member wherein the adjustment of the venturi throat is achieved by the provision of an intermediate control plate. More specifically, the diffusion member includes a lower plate 110, an upper plate 111 and an intermediate control plate 112 rotatably sandwiched between the confronting faces of the relatively stationary plates 110 and 111. The plate 110 is provided with an outwardly directed flange 113 which rests upon the planar annular border of a horizontal inlet port to a fuel mixture distributing manifold 114 associated with a multicylinder engine. The intermediate plate 112 is substantially the same diameter as the flange 113 and is provided with a radially extending control arm 116. The upper plate 111 is located within the duct 117 having peripheral flange 118 which rests upon the border of the intermediate plate 112 and is fixed to the plate 110. The lower plate 110 is provided with an upwardly projecting stub shaft 119 preferably of non-circular cross section which engages a corresponding opening in the upper plate 111 to maintain the plates 110 and 111 in relatively fixed position. The plates 110, 111 and 112 and the duct 117 are maintained in assembly by means of a series of bolts 120 engaging aligned openings formed in the plate 112 and in the flanges 113 and 118 and engaging tapped openings in the manifold. The bolts 120 register with arcuate slots 121 formed in the intermediate plate 112 to permit rotation thereof.

A plurality of vertical upwardly inwardly tapered apertures 122 are formed in the lower plate 110 and aligned and registering therewith are inwardly downwardly tapered apertures 123 formed in the upper plate 111, the apertures 122 and 123 forming venturis provided with restricted throat portions. The intermediate plate 112 has circular openings 124 formed therein which form part of the venturi throats and which are movable between positions in full registry with the venturis and completely out of registry therewith to effect a closing of the venturi throats.

Communicating with the upper portions of the apertures 122 at the venturi throats are a plurality of bores 126 which are connected to a source of fuel by way of a conduit 127. The various modifications and additions set forth in the previous embodiments may be employed in the device above described. However, the device is complete in and of itself and affords a carburetion system which delivers an optimum mixture under varying engine conditions.

Referring now to Figure 15 of the drawing, there is illustrated an arrangement wherein the improved diffusion member is employed with the carburetor and there is provided additional means for improving the air fuel mixture. More particularly, the numeral 130 designates an intake manifold for a multicylinder internal combustion engine, which has formed therein an upwardly directed inlet port surrounded by a peripheral shoulder 131 and communicates with a plurality of cylinder inlet ports 132. The diffusion member includes a lower stationary plate 133 having a border which rests on the manifold shoulder 131, the plate 133 having an enlarged axial opening and a plurality of circumferentially spaced openings along the border thereof which are aligned with tapped openings formed in the manifold shoulder 131. A centrally apertured cap member 134 has an apertured flange 136 resting on the peripheral border of the plate 133. The cap 134, lower diffusion plate 133, and the distributing manifold 130 are maintained in assembled condition by means of bolts 137 engaging aligned apertures therein.

Resting on the lower diffusion plate 133 and rotatable relative thereto is an upper diffusion plate 138 which is provided with an enlarged central opening coinciding with that formed in the lower plate 133. The plates 133 and 138 have a plurality of aligned cooperating venturi-defining apertures 139 formed therein which by relative rotation of the plate 138 may be selectively brought into positions between that of complete registry or fully out of registry with each other.

The manifold 130 includes a pair of diverging ducts 140 which extend from the inlet port of the manifold and have the lower ends connected by a cross duct 141. A baffle 142 is located in the duct 141 above the central outlet port 132 and below the upper wall of the duct 141. A tubular conduit 143, provided at its upper end with the outwardly-directed peripheral flange 144, is supported by the upper diffusion plate 138, the flange 144 registering with the corresponding circular groove formed about the central opening in the plate 138. The conduit 143 passes through the central opening in the lower plate 133 and enters through an opening in the upper wall of the cross duct 141 located centrally above the baffle 142. Disposed within the conduit 143 is a plug member 146 having helical grooves 147 formed in the wall thereof, the grooves 147 defining, with the confronting wall of the conduit 143, elongated passageways between the upper and lower ends of the conduit 143, the passageways being in good heat transfer relationship with the conduit wall. Furthermore, the conduit 143 is surrounded by a duct 148 in good heat transfer relationship therewith, the duct 148 being connected to the engine exhaust manifold so as to heat the walls of the passageways 147.

Mounted on the cap 134 and secured thereto by means of suitable bolts is the outlet conduit 150 of a carburetor which may be of any conventional construction. Located in the conduit 150 is the usual throttle-defining butterfly valve 151 which is connected by way of a linkage mechanism 152 to any desired control arrangement. The upper diffusion plate 138 is connected by way of a link 153 to a shaft 154 passing through a bushing located in the wall of the cap 134. The shaft 154 in turn is coupled by way of a suitable linkage mechanism 156 to the butterfly valve control shaft 157. The butterfly throttle valve 151 and the upper diffusion plate 138 are so coupled that upon full opening of the butterfly valve the venturi apertures 139 are in registering vertical alignment, and when the butterfly valve 151 is closed the venturi apertures are out of registry, thus closing the venturi throats.

The carburetion system last described offers many advantages over the conventional carburetion devices. During slow or idling speeds when the butterfly valve is in closed position permitting the passage of a minimum volume of fuel mixture, the venturi apertures 139 are closed thus permitting the air fuel mixture to flow into the cylinders only through the heated passageways 147. Thus, the air fuel mixture travels at a relatively high velocity and is heated to maintain the fuel in a fully vaporized condition inhibiting the formation of condensed droplets and the resulting difficulties. When the throttle is substantially completely opened the venturis 139 are concurrently opened therewith permitting a major proportion of the air fuel mixture to pass through the venturis which insures a complete vaporization of the fuel therein without the heating thereof to maintain the mixture at a high velocity. This is highly desirable and contributes to the efficiency and operating qualities of the engine. The optimum air fuel qualities are likewise realized at intermediate positions of the throttle valve.

In Figures 16 through 17 there is illustrated another embodiment of the present invention differing from those previously described principally in the configuration of the venturi apertures and the means for adjusting the fuel openings into the venturis. The diffusion member includes an upper plate 160 and a lower plate 161 of annular shape each including inner and outer coaxial tubes 163 and 164 respectively. Extending between and supported by the upper tubes 163 and 164 are radially extending circumferentially spaced vanes 166 of upwardly directed triangular cross section. The lower diffusion plate 161 is provided with similarly arranged vanes 167 being, however, of downwardly directed triangular cross-section. The vanes 166 as well as the vanes 167 are spaced by the radially extending apertures 168 and 169 respectively, which when in registry define elongated venturis and which are fully adjustable to a position where the venturi throats are completely closed. The confronting edges of the tubular members 163 and 164 have circumferentially spaced mutually engaging inclined teeth 170 formed therein, the teeth 170 being separated by flat portions 171, the confronting portions 171 defining passageways 172 permitting the introduction of fuel into the venturi throats. It should be noted that when the teeth 170 are in complete engagement, as illustrated in Fig. 17 of the drawing, the passageways 172 are of minimum cross section and the venturi throats are closed. As the plates are rotated relative to each other the venturi throat openings increase as do the cross-sectional areas of the fuel passageways 172. The diffusion member last described may be employed in a manner similar to those previously set forth.

Referring now to Figs. 18 to 20 of the drawings, there is illustrated a further embodiment of the present invention, which like that illustrated in Fig. 15 is provided with means for heating part of the fuel mixture, but includes the additional features which permit the adjustment of the relative proportions of the heated and unheated fuel mixtures and in which the entire fuel mixture either passes through a diffusion system or is produced therein.

More particularly, the improved carburetion system includes an intake manifold bar, a multi-cylinder internal combustion engine, the intake manifold having an upwardly directed opening surrounded by a shoulder upon which is mounted a circular conduit 181 which is identical to the circular conduit 65 in Fig. 11, it being understood that a carburetor similar to that shown in Fig. 11 is mounted on the assembly shown in Fig. 18. Located within the manifold and in axial alignment with the conduit 181 is a tube 182 disposed below the conduit 181 and surrounded by a duct 183 in heat transfer relationship with the tube 182 and preferably connected to the exhaust gases from the engine. Nesting within the tube 182 is a plug 184 having a plurality of parallel helical grooves 186 formed therein which define fuel mixture passageways which are heated by the exhaust gas duct 183. Extending from the upper opening of the manifold 180 are outer ducts 187 which are connected at the bottom by a cross duct 188. A baffle 189 is located in the cross duct 188 between the lower wall thereof and the bottom of the plug 184 to promote a mixture of the gases passing through the passageways 186 and the ducts 187 prior to their entry to the cylinder inlet ports 190.

Located within the conduit 181 are upper and lower vertically spaced diffusion plates 191 and 192 respectively separated by an intervening passageway 194 which may be connected to a source of fuel as aforesaid. The upper plate 191 has formed therein a plurality of downwardly inwardly tapered apertures 196 and the lower plate 192 has formed therein a corersponding plurality of downwardly outwardly tapered apertures 197. The apertures 196 are movable into complete registry and vertical alignment with the apertures 197 to define therewith venturis having restricted throat portions communicating with the passageways 194. By rotating the plate 191 relative to the plate 192, the venturi throats may be varied in cross sectional area.

A vertical partition 198 is disposed in each of the lower apertures 197 and has a tapered upper edge 199 projecting above the upper edges of the apertures 197. The lower edges of the partitions 198 are joined by walls 200 to the upper edge of the tube 182. Walls 201 projecting upwardly from the upper edge of the tube 182 to the lower edges of the apertures 202, with walls 200 and 202 define passageways which lead to aperture sections 202 delineated by the partitions 198, and opposite sections 203 communicating with the manifold conduits 187. A cover plate 204 is superimposed on the upper face of the venturi plate 192 and is provided with apertures 206 which are initially in full registry with the venturi throats. It is apparent that by rotatably adjusting the valve plate 191 the proportions of the fuel mixture which travel through the heat passageways 186 and through the ducts 187 may be varied thereby varying the temperature and characteristics of the fuel mixture delivered to the cylinders.

While there have been described and illustrated preferred embodiments of the present invention, it is apparent that numerous alterations and omissions may be made without departing from the spirit thereof.

What is claimed is:

1. In an internal combustion engine including a duct communicating with a combustion chamber of said engine, a fuel induction system comprising a pair of members arranged in confronting relationship and disposed in communication with said duct and both having formed therethrough venturi-defining apertures each adapted to register with an aperture in the other of said members and narrowing theretoward to define constricted throat portions, means maintaining said members in spaced relationship in the vicinity of said apertures to define therebetween a cavity which intersects and communicates with said venturis at said throat portions thereof, and means for connecting said cavity to a source of fuel.

2. In an internal combustion engine including a duct communicating with a combustion chamber of said engine, a fuel induction system comprising a pair of substantially superimposed plates disposed in communication with said duct, both of said plates having formed therein apertures each adapted to register with an aperture in the other of said plates and narrowing theretoward to define venturis provided with constricted throat portions, and means for moving said plates relative to each other whereby to transversely vary the registry between said respective venturi-defining apertures.

3. In an internal combustion engine including a duct communicating with a combustion chamber of said engine, a fuel induction system comprising a pair of substantially superimposed, coaxially circular plates disposed in communication with said duct, said plates having formed therein a plurality of pairs of normally longitudinally fully registering apertures which are shaped to define venturis provided with constricted throat portions, and means for rotating said plates relative to each other whereby to transversely vary the registry between said respective venturi-defining apertures.

4. A fuel induction system in accordance with claim 3, wherein said plate rotating means includes a rack disposed along the outer border of one of said plates and a pinion engaging said rack.

5. A fuel induction system in accordance with claim 3, including a throttle valve located in said duct, and means intercoupling said throttle valve and said plate rotating means.

6. A fuel induction system in accordance with claim 3, wherein said venturi-defining apertures are disposed along circles concentric with said plate axes.

7. A fuel induction system in accordance with claim 6, wherein the diameters of said apertures decrease toward said plate axes.

8. In an internal combustion engine including a duct communicating with a combustion chamber of said engine, a fuel induction system comprising a pair of substantially superimposed, coaxial, circular plates disposed in communication with said duct, said plates having formed therein a plurality of pairs of normally longitudinally fully registering apertures which are shaped to define venturis with constricted throat portions, said plates having passageways formed therein communicating with said constricted throat portions through the walls thereof and means for rotating said plates relative to each other whereby to transversely vary the registry between said respective venturi-defining apertures.

9. A fuel induction system in accordance with claim 8, wherein said passageways are defined by a circular recess formed in a face of one of said plates, said face confronting said other plate.

10. A fuel induction system in accordance with claim 9, wherein one of said plates has a bore formed therein defining a fuel passage communicating with said recess.

11. A fuel induction system in accordance with claim 8, including means defining a fuel chamber communicating with said passageways, a float located in said chamber, a conduit including a valve connecting said chamber to a source of liquid fuel, and means operatively connecting said float to said valve whereby to maintain a constant level of fuel in said chamber substantially at the level of communication between said passageways and said apertures.

12. In an internal combustion engine including a duct communicating with a combustion chamber of said engine, a fuel induction system comprising a diffusion member disposed in communication with said duct and having a plurality of venturi-defining apertures extending therethrough, said venturis having constricted throat portions and having openings formed in the walls thereof near said throat portions, means for adjusting the size of said throat portions, and means defining conduits for connecting said openings to a source of fuel.

13. In an internal combustion engine including a duct communicating with a combustion chamber of said engine, a fuel induction system comprising a pair of superimposed plates disposed in communication with said duct, both of said plates having formed therein apertures each adapted to register with an aperture in the other of said plates and shaped to define venturis, said plates defining therebetween fuel passageways communicating with said venturis, and means for varying the distance between said plates to vary the cross sectional area of said passageways.

14. A fuel induction system in accordance with claim 13, including means responsive to said passageway varying means for varying the distance between said plates and the registry of said apertures concurrently.

15. A fuel induction system in accordance with claim 14 wherein said means for varying said aperture registry concurrently with variation of said passageways includes means threadedly mounting one of said plates for motion toward and away from the other of said plates in response to relative rotation between said plates.

16. An improved carburetor comprising a vertical duct, a bowl coaxially located in said duct and supported therein, the confronting faces of said bowl and said duct defining a plurality of circumferentially spaced upwardly inwardly tapered first apertures, a plate disposed above said first apertures and provided with a plurality of circumferentially spaced downwardly inwardly tapered second apertures adapted to be brought into longitudinal registry with said first apertures to define a plurality of venturis having constricted throat portions, means for rotating said plate whereby to vary the cross sectional area of said throat portions, means for adjusting the height of said plate within said conduit to provide passageways of adjustable cross section communicating with said constricted throat portions, means providing communication between said passageway and said bowl, means for introducing a liquid fuel into said bowl, and means for maintaining the fuel in said bowl at a predetermined level.

17. In an internal combustion engine, a fuel induction system comprising fuel conduit means extending to a combustion chamber of said engine, said conduit means including first and second ducts arranged to provide alternative fuel paths, means for heating said first duct, a diffusion member disposed in said second duct and including a pair of substantially superimposed plates, both of said plates having formed therein apertures each adapted to register with an aperture of the other of said plates, and means for adjusting said plates relative to each other between positions wherein said apertures are in complete registry and wherein said apertures are out of registry to close said second duct.

18. In an internal combustion engine, a fuel induction system comprising fuel conduit means leading to a combustion chamber of said engine, said conduit means including first and second ducts arranged to provide alternative fuel paths, means for heating said first duct, a valve member arranged to control the flow of fuel through said conduit means, said valve member having fuel passage means formed therein, means for varying the cross-sectional area of said fuel passage means to control the fuel volume, and means for controlling the proportion of fuel passing through said first and second ducts.

19. A fuel induction system in accordance with claim 18 wherein said means for varying the proportion of fuel passing through said first and second ducts is operable to direct an increasing proportion of fuel into said first duct in response to decreasing of the total volume of fuel.

20. A fuel induction system in accordance with claim 19 wherein said valve member comprises a plurality of plates arranged in laminar relationship and each having formed therein apertures each adapted to register with an aperture of each of the other of said plates to define said fuel passage means said fuel volume control means including means mounting at least one of said plates for movement relative to the other plates whereby to vary the registry between said apertures, and said proportion control means includes partition means disposed in said fuel passage means to divide said fuel passage means into sections communicating respectively with said first and second ducts and positioned to direct a greater proportion of fuel into said first duct when said fuel passage means is partially closed than when said fuel passage means is fully open.

References Cited in the file of this patent

UNITED STATES PATENTS

| | | |
|---|---|---|
| 1,700,921 | Chanard | Feb. 5, 1929 |
| 1,816,531 | Holloway | July 28, 1931 |
| 1,829,632 | Chanard | Oct. 27, 1931 |
| 2,086,292 | Chanard | July 6, 1937 |